United States Patent [19]

Broekhuis

[11] Patent Number: 4,839,431

[45] Date of Patent: Jun. 13, 1989

[54] ELASTOMER COMPRISING AT LEAST ONE CONJUGATED OLEFIN GROUP AND METHOD OF MAKING SAME

[75] Inventor: Antonius A. Broekhuis, Amsterdam, Netherlands

[73] Assignee: Shell Oil Company, Houston, Tex.

[21] Appl. No.: 948,336

[22] Filed: Dec. 31, 1986

[51] Int. Cl.$^4$ ............................................. C08F 279/02
[52] U.S. Cl. ................................... 525/298; 525/300; 525/271
[58] Field of Search ............... 525/383, 298, 300, 366, 525/331.9, 271

[56] References Cited

U.S. PATENT DOCUMENTS

| | | | |
|---|---|---|---|
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 8/1966 | Holden et al. | 260/876 |
| 3,274,147 | 9/1966 | Zelinski et al. | 525/383 |
| 3,322,856 | 5/1967 | Holden et al. | 260/876 |
| 3,496,154 | 2/1970 | Wofford | 260/84.7 |
| 3,498,960 | 3/1970 | Wofford | 260/84.7 |
| 3,646,166 | 2/1972 | Canter et al. | 525/298 |
| 3,846,387 | 11/1974 | Su | 525/300 |
| 3,892,819 | 7/1975 | Najvar | 260/836 |
| 4,113,694 | 9/1978 | Arrighetti et al. | 525/300 |
| 4,145,298 | 3/1979 | Trepka | 252/51.5 |
| 4,258,162 | 3/1981 | Uraneck et al. | 525/383 |
| 4,297,451 | 10/1981 | Uraneck et al. | 525/366 |
| 4,400,478 | 8/1983 | Gergen et al. | 523/514 |

Primary Examiner—Wilbert J. Briggs, Sr.

[57] ABSTRACT

Elastomeric homopolymers and copolymers comprising at least one active group containing an alkali metal atom are chemically treated to incorporate at least one conjugated diolefin linkage. The chemical treatment consists of reacting the living polymers with 2,3-ethylenically unsaturated aldehyde or ketone and then converting the reaction product thus obtained to the corresponding alcohol and dehydrating the alcohol to produce the conjugated diolefin linkage. The chemically treated elastomeric homopolymers and copolymers are useful in any of the applications known in the prior art for the corresponding untreated homopolymers and copolymers. Moreover, the chemically treated elastomeric polymers may be reacted with an unsaturated monomeric dienophile through a 4+2 Diels Alder addition reaction and a polymer then grafted onto the chemically treated elastomeric polymer or the chemically treated elastomeric polymer may be reacted directly with another (different) polymer containing at least one dienophile group. When the polymer grafted onto or reacted with the chemically treated elastomeric polymer is an unsaturated polyester or a polyvinylester the resulting product is advantageously used as a modifier in thermosetting resin compositions. The resulting thermosetting resin composition as well as the molded products produced therefrom, will, in general, exhibit improved properties.

12 Claims, No Drawings

ELASTOMER COMPRISING AT LEAST ONE CONJUGATED OLEFIN GROUP AND METHOD OF MAKING SAME

BACKGROUND OF THE INVENTION

This invention relates to a polymeric material and to a process for preparing said polymeric material. More particularly, this invention relates to an elastomeric polymer which is modified to incorporate at least one conjugated diolefin linkage therein and to a process for preparing the same.

Elastomeric homopolymers and copolymer of various monomers are, of course, well known in the prior art. Moreover, polymers of this type having at least one active group comprising an alkali metal atom are also well known. In general, polymers comprising at least one alkali metal atom are prepared by polymerizing the monomers, either alone or in combination with other monomers, in the presence of an organometallic catalyst, wherein the metal is an alkali metal, particularly lithium, at a temperature within the range of from about $-150°$ C. to about $300°$ C. Copolymers prepared in this manner may be block, tapered or random. Polymers of this type are described in a large number of references including, for example, U.S. Pat. Nos. 3,135,716; 3,150,209; 3,265,765; 3,231,635; 3,322,856; 3,496,154; 3,498,960; 4,145,298 and 4,298,202. It is also known in the prior art, that the reactive group or groups containing the alkali metal atom, particularly a lithium atom, may be reacted with various reagents to replace the alkali metal atom with a more stable reactive group. Such conversion is taught, for example, in U.S. Pat. Nos. 3,135,716 and 3,150,209. The reactive groups thus incorporated are said to facilitate curing through cross-linking or coupling.

It is also known in the prior art to incorporate one or more carboxyl groups into an elastomeric polymer and then using the thus modified copolymer in various applications, such as a modifier for thermosetting polyester resin compositions and in various other applications requiring polymers with adhesive properties. Incorporation of the carboxylic containing copolymer into polyester resin compositions may be via physical admixture as taught in the background sections of U.S. Pat. Nos. 4,439,438 and 4,400,478 as well as elsewhere in U.S. Pat. No. 4,329,438 or via chemical incorporation of the carboxyl containing polymer into the polyester as is taught in U.S. Pat. No. 3,892,819. In general, elastomeric homopolymers of conjugated diolefins and/or elastomeric copolymers of at least one conjugated diolefin and at least one other vinyl monomer, particularly an alkenyl substituted aromatic monomer, have, heretofore, been incorporated into thermosetting unsaturated polyester resin compositions in an effort to improve both the surface characteristics and the impact resistance of cured molded products. Physical incorporation of such thermoplastic modifiers has, however, heretofore frequently resulted in destructive phase separation of the components in the polyester resin composition and the properties of the cured products are frequently inferior to rather than superior to those obtained with a conventional polyester resin composition. The use of polymers comprising pendant carboxyl groups apparently reduces the negative results heretofore realized when a thermoplastic polymer was incorporated into an otherwise conventional thermosetting polyester resin composition but as indicated in the background section of U.S. Pat. No. 4,329,438 none of these approaches has been completely successful. The need, then, for an improved elastomeric modifier for polyester resin compositions is believed to be readily apparent.

SUMMARY OF THE INVENTION

It has now been discovered that the foregoing and other disadvantages of the prior art elastomeric polymers useful as modifiers can be overcome or at least significantly reduced with the elastomeric polymer of the present invention. It is, therefore, an object of the present invention to provide an improved elastomeric polymer and a process for making said improved elastomeric polymer. It is another object of this invention to provide such an elastomeric polymer which is useful to impart impact resistance to a thermosetting unsaturated polyester resin composition. It is still another object of this invention to provide such an improved elastomeric polymer which is particularly effective in imparting impact resistance when used in sheet and bulk molding applications. It is yet another object of this invention to provide such an improved elastomeric polymer which when used in a thermosetting resin composition will impart improved surface characteristics. It is an even further object of this invention to provide such an improved elastomeric polymer which can be incorporated into a thermosetting unsaturated polyester resin composition without resulting in destructive phase separation. The foregoing and other objects and advantages will become apparent from the description set forth hereinafter.

In accordance with the present invention, the foregoing and other objects and advantages are accomplished by chemically treating an elastomeric homopolymer or copolymer, which copolymer may be either random, block or tapered, to incorporate at least one conjugated diolefin linkage therein. The chemical treatment comprises the steps of first reacting an elastomeric homopolymer or copolymer having at least one active site comprising an alkali metal atom with a 2,3-ethylenically unsaturated aldehyde or ketone to produce an alkali metal salt product and thereafter converting the alkali metal salt to the corresponding alcohol and then dehydrating the alcohol to yield an elastomeric polymer comprising at least one conjugated diolefin linkage therein.

DETAILED DESCRIPTION OF THE INVENTION

As indicated supra, the present invention relates to an elastomeric homopolymer or copolymer which has been chemically treated to incorporate a conjugated diolefin linkage therein. In general, any of the elastomeric homopolymers or copolymers known in the prior art may be chemically treated to incorporate a conjugated diolefin linkage in accordance with the present invention. Useful elastomeric polymers, then, include those prepared in bulk, suspension, solution and emulsion processes. As is well known, polymerization of monomers to produce an elastomer may be accomplished with free-radical, cationic and anionic initiators or polymerization catalyst. As indicated more fully hereinafter, however, it is important, in the process of this invention, that the elastomeric polymer comprise at least one active group containing an alkali metal atom when it is treated to incorporate the conjugated diolefin linkage. As a result, elastomeric polymers prepared with free-radical or cationic initiators, as well as those prepared with an anionic initiator and then deactivated, must be metallated to incorporate at least one active site comprising an alkali metal atom prior to treatment thereof to incorporate the conjugated diolefin linkage by the method of this invention. Metallization may, of course, be accomplished using techniques well known in the prior art such as the method taught in U.S. Pat. No. 4,145,298, the disclosure of which patent is herein incorporated by reference. Notwithstanding that any elastomeric polymer may be modified by the method of the present invention, the process of this invention is simplified when the treated polymer is prepared via anionic initiation using an organo alkali metal compound initiator and then treated in accordance with the method of this invention prior to deactivation of the alkali metal active site. The invention will, then, be described in greater detail by reference to the treatment of such polymers. Any elastomic polymer metallated to incorporate at least one active site containing an alkali metal atom could, however, be substituted for the preferred elastomers referred to in the description.

The method of the present invention is, then, particularly effective with diene homopolymers and copolymers which are prepared via anionic polymerization with an organo metallic catalyst, wherein said metal is an alkali metal, particularly lithium, since the active groups comprising the alkali metal atom may be readily treated to incorporate a conjugated diolefin linkage. Diene homopolymers and copolymers prepared via other techniques, as well as other elastomers, may, however, be metallated so as to comprise at least one active site containing an alkali metal atom, using methods well known in the prior art, and then treated to incorporate a conjugated diolefin linkage in accordance with the present invention.

Diene homopolymers and copolymers comprising at least one terminal active group containing an alkali metal atom and prepared via anionic polymerization techniques, which polymers are particularly useful in the present invention, may be prepared in accordance with techniques well known in the prior art. In general, such polymers are prepared by contacting the monomer or monomers to be polymerized with an organo alkali metal compound in a suitable solvent at a temperature within the range from about $-150°$ C. to about $300°$ C. Particularly effective polymerization initiators are organo lithium compounds having the general formula $RLi_n$ wherein R is an aliphatic, cycloaliphatic or aromatic hydrocarbon radical having from 1 to 20 carbon atoms and n is an integer of 1 to 4. In general, the polydienes useful in the present invention will have a molecular weight within the range of from about 2,000 to about 200,000 and when the polydiene is a copolymer of 1 or more diolefins and 1 or more other monomers, the polydiene will comprise from about 20 to about 99 wt % monomeric diolefin units. In general, the polydiene useful in this invention may be a polymer of one or more dienes, containing from 4 to about 12 carbon atoms such as 1,3-butadiene, isoprene, piperylene, methylpentyl diene, phenylbutadiene, 3,4-dimethyl-1,3-hexadiene, 4,5-diethyl-1,3-octadiene and the like, preferrable conjugated dienes containing 4 to 8 carbon atoms. Moreover, one or more of the hydrogen atoms in these diolefins may be substituted with a halogen. The polydiene may also be a copolymer of one or more of the aforementioned diolefins and one or more other monomers. Other monomers which may be used include vinylaryl compounds such as styrene, various alkyl styrenes, paramethoxystyrene, vinyl naphthalene, vinyl toluene and the like, heterocyclic nitrogen-containing monomers such as pyridine and quinoline derivatives containing at least one vinyl or α-methyl vinyl group such as 2-vinylpyridine, 3-vinylpyridine, 4-vinylpyridine and the like. Still other useful comonomers include acrylic and methylacrylic acid esters, vinyl halides, vinylidene halides, various vinyl esters and the like.

The diene homopolymers and copolymers useful in the present invention include those terminally reactive homopolymers and copolymers described in U.S. Pat. Nos. 3,135,716; 3,150,209; 3,496,154; 3,498,960; 4,145,298 and 4,238,202, the disclosure of which patents are herein incorporated by reference. Those diene homopolymers and copolymers having only one terminal lithium atom, and described in U.S. Pat. No. 3,150,209; 3,496,154; 3,498,960; 4,145,298 and 4,238,202, are particularly useful in the present invention. Diene copolymers useful in the present invention also include the block copolymers prepared in accordance with the methods described in U.S. Pat. Nos. 3,231,635; 3,265,765 and 3,322,856, the disclosure of which patents are incorporated herein by reference. Particularly useful block copolymers are those block copolymers having the general formulae $B_x$—$(A-B)_y$ and $A_x$—$(B-A)_y$ wherein A and B are as defined in the aforementioned U.S. Pat. Nos. 3,231,635; 3,265,765 and 3,322,856, x is a number equal to 0 or 1 and y is a whole number from 1 to about 15.

As indicated supra, it is, at least, desirable in the present invention that the diene homopolymer or copolymer treated comprise at least one active site containing an alkali metal atom, preferably a lithium atom. In the event that the diene homopolymer or copolymer to be treated in the present invention does not contain such an active group, the polymer may first be treated to incorporate such a group. As well known in the prior art, at least one active site containing an alkali metal atom, particularly a lithium atom, may be incorporated into a polymer by contacting said polymer with an organo alkali metal compound in a suitable solvent or diluent at a temperature within the range from about 0 to about $200°$ C. In general, any of the organo alkali metal compounds known in the prior art to be useful as polymerization initiators may be used in the reaction to create an active site containing an alkali metal atom. As also well know in the prior art, the metallization reaction may be promoted with various amines and alkoxide salts.

To produce an elastomeric homopolymer or copolymer comprising at least one conjugated diolefin linkage in accordance with the present invention, one will start with an elastomeric homopolymer or copolymer containing at least one alkali metal atom. For convenience, an elastomeric polymer comprising at least one active group containing an alkali metal atom is frequently referred to hereinafter as either an active or living polymer. To incorporate the conjugated diolefin linkage, then, an active or living polymer is treated by reacting the same first with a 2,3-ethylenically unsaturated aldehyde (1) or ketone (2) having, respectively, the following general formula:

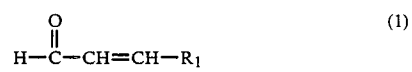

wherein $R_1$ is H or an aliphatic, cyclic, alicyclic, aryl or aliaryl hydrocarbon radical having from 1 to 10 carbon atoms; and

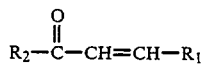 (2)

wherein $R_1$ is as defined above and $R_2$ is an aliphatic, cyclic, alicyclic, aryl or aliaryl hydrocarbon radical having 1 to 10 carbon atoms;
and thereafter converting the resulting lithium salt to the corresponding alcohol and then dehydrating the alcohol. As is well known in the prior art, the latter two steps may be accomplished, in effect, simultaneously when an excess of acid is used to convert the lithium salt to the corresponding alcohol at an elevated temperature.

In general, reaction of the 2,3-ethylenically unsaturated aldehyde or ketone with the active or living polymer will be accomplished in a suitable solvent at a temperature within the range from about 10° C. to about 200° C. Nominal holding times at reaction conditions will, generally, range from about 1 to about 120 minutes. Suitable solvents include any of the solvents known in the prior art to be effective for use during preparation of the diene homopolymer or copolymer. These include hydrocarbons such as paraffins, cycloparaffins, alkyl-substituted cycloparaffins, aromatics and alkyl-substituted aromatics containing from about 4 to about 10 carbon atoms per molecule. Suitable solvents include benzene, toluene, cyclohexane, methylcylohexane, n-butane, n-hexane, n-heptane and the like.

In general, the reaction between the living polymer and the 2,3-ethylenically unsaturated aldehyde or ketone proceeds stoichiometrically. It will, then, generally, be sufficient to combine 1 mole of 2,3-ethylenically unsaturated aldehyde or ketone for each mole of active sites to be converted. In this regard, it should be noted that if the living polymer contained, on average, two active groups containing alkali metal atoms per polymer segment, it would take 2 moles of ethylenically unsaturated aldehyde or ketone per mole of polymer to convert all of the active sites to the corresponding alkali metal salt. Similarly, if the living polymer contained only, on average, one active site containing an alkali metal atom per polymer segment, it would take only 1 mole of unsaturated aldehyde or ketone per mole of polymer to convert all of the active sites to the corresponding lithium salt.

The alkali metal salt produced by reacting the living polymer with a 2,3-ethylenically unsaturated aldehyde or ketone is next converted to the corresponding alcohol. Any of the methods known in the prior art to be effective for such conversions may be used in the present invention. One such method is to simply react the alkali metal salt with an acid. In general, any acid, organic or inorganic, may be used. Suitable acids, then, include the series of aliphatic carboxylic acids starting with formic acid, the series of aromatic carboxylic acids starting with benzoic acid and the various mineral acids such as hydrochloric acid, nitric acid, sulfuric acid and the like. After the corresponding alcohol has been produced, the same will be dehydrated to yield the desired conjugated diolefin structure. Generally, this may be accomplished simply by heating the alcohol. More expediently, however, this may accomplished by effecting the acid treatment with an excess of acid at an elevated temperature. In a preferred embodiment of the present invention, then, the acid treatment will be accomplished at a temperature within the range from about 40° C. to about 200° C. Generally, nominal holding times within the range from about 1 to about 120 minutes will be sufficient to permit both conversion of the alkali metal salt to the corresponding alcohol and dehydration of the alcohol. Again, conversion of the alkali metal salt to the alcohol will occur stoichiometrically. Notwithstanding, an excess amount of acid will generally be used during the conversion of the alkali metal salt to the corresponding alcohol since the excess of acid will catalyze the dehydration.

The elastomeric homopolymer or copolymer thus produced and containing at least one conjugated diolefin structure may be recovered from solution using conventional technology well known in the prior art or used directly in the preparation of a modified polyester as described and claimed in copending U.S. patent application Ser No. 948,374, filed on 12/31/86, now U.S. Pat. No. 4,775,718, the disclosure of which copending application is incorporated herein by reference. As indicated supra, the modified elastomeric polymer of this invention may be used in various unsaturated polyester resins for the purpose of improving impact resistance in structures molded therewith. The modified elastomer may be added directly to such thermosetting compositions or the same may first be, in effect, grafted on to the backbone of a polyester used in such compositions as described in the aformentioned copending application.

PREFERRED EMBODIMENT OF THE INVENTION

In a preferred embodiment of the present invention, a polydiene block copolymer will be treated so a to incorporate a conjugated diolefin group into said block copolymer. The block copolymer will be prepared using the method described in U.S. Pat. No. 3,231,635 and will comprise a single alkenyl-substituted aromatic hydrocarbon block and a single diolefin block. The block copolymer used in the preferred embodiment may be represented by the general formula A-B wherein A and B are, respectively, polymer blocks of an alkenyl-substituted aromatic hydrocarbon and a diolefin. In the preferred embodiment, the alkenyl-substituted aromatic hydrocarbon block will have a weight average molecular weight within the range of from about 1,000 to about 100,000 and the diolefin block will have a weight average molecular weight within the range of from about 1,000 to about 150,000. In a most preferred embodiment, the alkenyl-substituted aromatic hydrocarbon will be styrene and the diolefin will be a conjugated diolefin; viz., either butadiene or isoprene.

In the preferred embodiment, the block copolymer will be treated in accordance with this invention before the active site formed during polymerization has been converted or deactivated. In the preferred embodiment, the block copolymer will contain, on average, approximately one active site containing a lithium atom per polymer segment, which active site will be on the diolefin block. In the preferred embodiment, the living block copolymer will first be reacted with acrolein to produce the corresponding lithium salt and then with about a 10 wt. % excess of a sulfuric acid at an elevated temperature to, in effect, simultaneously form the corresponding alcohol and to dehydrate said alcohol.

In the preferred embodiment, treatment of the active polymer will be accomplished in the same solvent as was used for polymerization. The reaction between the living polymer and acrolein will be accomplished at a temperature within the range rom about 25° C. to about 150° C. at a nominal holding time within the range from about 1 to about 120 minutes. The resulting lithium salt will then be reacted with a monocarboxylic acid at a temperature within the range from about 40° C. to about 200° C. at a nominal holding time within the range from about 1 to about 120 minutes. In a most preferred embodiment of the present invention, the acid will be sulfuric acid. The preferred modified polymers of this invention, which modified polymers are prepared by using the preferred operating conditions, may then be recovered.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, a styrene-butadiene block copolymer was prepared as a control or base line sample. The block copolymer was prepared under anhydrous and anaerobic conditions in a closed, glass reaction vessel. Initially, 13.1 g of styrene dissolved in 170 g of cyclohexane was charged to the reaction vessel along with 100 $\mu$l of n-butoxy, t-butoxy ethane and 3ml of a 0.25N solution of s-butyl lithium. The reaction vessel was heated to 50° C. and when the polymerization of styrene was substantially complete 24.1 g of polymerization grade butadiene monomer was added to the vessel. Polymerization of the diene monomer was allowed to proceed substantially to completion and the resulting styrene-butadiene living block copolymer was quenched by the addition of an excess of methyl alcohol. The nonfunctionalized styrene-butadiene block copolymer was then recovered as crumb by coagulation with and excess of methyl alcohol. Analysis of the recovered product indicated that the block copolymer contained a single block of styrene having a weight average molecular weight of 13,400 and a single butadiene block having a weight average molecular weight of 29,400.

EXAMPLE 2

In this example, 3 styrene-butadiene block copolymers containing a single acrolein end group were prepared. For convenience, these polymer samples have been identified as A thru C. Each sample was prepared by repeating the polymerization steps summarized in Example 1 but before deactivating the lithium atom with methyl alcohol the living diblock copolymer was titrated with acrolein until the pale yellow color of the living anionic polymer had disappeared. The end-capped block copolymer was then contacted with an aliquot of ammonium chloride in methyl alcohol to deactivate the lithium atom. Each of the three samples were recovered by coagulating with an excess of methyl alcohol. After recovery, each sample was analyzed to determine the weight average molecular weight of each block and the amount of coupled products in each sample. These results are shown in the following table:

| Acrolein Capped Block Copolymers | A | B | C |
|---|---|---|---|
| Mol. Wt. of Styrene Block ($\times 10^{-3}$) | 14.4 | 13.3 | 13.3 |
| Mol. Wt. of Butadiene Block ($\times 10^{-3}$) | 29.1 | 29.1 | 29.5 |
| Coupled Product (wt %) | 4 | 5 | 5 |

EXAMPLE 3

In this example, the acrolein capped polymers identified as A and B in Example 2 were combined and dissolved in 600 ml cyclohexane. The solution was then divided into two equal sized aliquots and each aliquot treated with an excess of maleic anhydride to produce an elastomer having a cyclic anhydride moiety chemically bonded thereto through a 6-carbon atom cyclic structure containing one C,C double bond and to dehydrate the alcohol which was produced in Example 2. The treatment was accomplished by adding 0.25 g of maleic anhydride to each aliquot and then heating both to reflux and holding each at this temperature for four hours. The resulting reaction products were then recovered as a crumb by coagulating in excess methyl alcohol. The elastomer thus produced could be substituted for a portion of the unsaturated dicarboxylic acid or anhydride monomer in any of the polyester resin operations hereinbefore discussed.

EXAMPLE 4

In this example, the acrolein capped polymer identified as C in Example 2 was dissolved in 215 ml xylene and combined with 10 g of a maleate/propylene glyclol unsaturated polyester resins (Koppers 3702-5 unsaturated polyester resin). Three drops of concentrated $H_2SO_4$ were then added to this solution and the solution heated to reflux temperature and held for four hours. The $H_2SO_4$, inter alia, acted as a catalyst for the Diels Alder reaction. As a result of this treatment, the alcohol produced in Example 2 was dehydrated and the conjugated diolefin group produced then reacted with the maleate/propylene glyclol unsaturated polyester resin. The product was contacted with an excess of methyl alcohol, a good solvent for the polyester resin. As a result of the contacting with methanol, the reaction product of the end-capped elastomer and the polyester and any unreacted end-capped elastomer were precipitated while any unreacted polyester remained in solution. After separation, the coagulated product was subjected to IR analysis to confirm the presence of grafted polyester therein. This was confirmed by a peak occurring at 1640 $cm^{-1}$. Signals in the IR spectrum at 690 $cm^{-1}$ and 920 $cm^1$ also indicated that the coagulated product contained styrene-butadiene block copolymer. The relative intensities of the IR signals indicated that the modified polyester contained significant amounts of both of the polymeric reactants.

EXAMPLE 5

In this example, a portion of the block copolymer produced in Examples 1 and a portion of the acrolein modified block copolymer produced in Example 2 and identified as C were dissolved in styrene monomer at a concentration of 30wt % polymer in said solution. A 50g aliquot of each solution was then treated with 3 drops of sulfuric acid and blended with an equal weight of solution (about 70wt % unsaturated polyester) containing Koppers 3702-5 unsaturated polyester, the same polyester which was modified in Example 4, in styrene.

The blending was accomplished at 500 rpm for 3 minutes using a 1" jiffy blade positioned in an 8 oz jar. Each of the blends were then set aside and observed to determine whether gross phase separation would occur. The observation are summarized in the following table:

| Blend | Phase Separation |
|---|---|
| with polymer of example 1 | complete after 2 days |
| with polymer of example 2 | no separation after 7 days |

EXAMPLE 6

In this example, blends were prepared with the polymers described in examples 1 and 4 and Koppers 3702-5 polyester. These resin blend were then used in the preparation of Sheet Molding Compound pastes. Each of the pastes were prepared according to the following recipe:

| | |
|---|---|
| 100 g | Block Copolymer in Styrene Monomer (30 wt % polymer) |
| 100 g | Koppers 3702-5 Unsaturated Polyester Resin (70 wt % in styrene) |
| 300 g | Calcium Carbonate |
| 6 g | Zinc Stearate |
| 0.5 g | Black pigment |
| 2.6 g | t-Butyl perbenzoate |
| 0.5 g | PEP-100 Cure Promoter |
| 7.8 g | Marinco H Thickening Agent |

Each paste was blended in an 800 ml plastic beaker using a 1" Jiffy Mixer blade at 500 rpm. The fully blended pastes were then transferred to 16 oz jars, sealed and set aside to age. After 18 days, the paste were inspected to access the homogeneity of the blend. The paste samples were evaluated for (1) the lack of exudate formation, (2) the absence of chalkiness and (3) smoothness. Each criteria was rated on a scale from 1 (worst) to 5 (best) so that a superior plate would get a combined score of 15, and the worst possible score would be 3. The results of each of the paste are summarized in the following table:

| Paste | Numerical Rating |
|---|---|
| with polymer of example 1 | 3 |
| with polymer of example 4 | 9 |

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A method for preparing an elastomeric homopolymer or copolymer containing at least one conjugated diolefin linkage comprising the steps of:
    (a) reacting an elastomeric homopolymer or copolymer having at least one active group containing an alkali metal atom with a 2,3-ethylenically unsaturated aldehyde or ketone to produce an alkali metal salt;
    (b) converting the alkali metal salt from step (a) to the corresponding alcohol; and
    (c) dehydrating the alcohol from step (b).

2. The method of claim 1 wherein said 2,3-ethylenically unsaturated aldehyde has the following general formula:

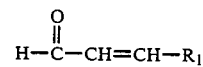

wherein $R_1$ is H or a hydrocarbon radical having from 1 to 10 carbon atoms.

3. The method of claim 1 wherein said ketone has the following general formula:

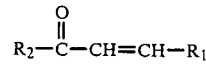

wherein $R_1$ is H or a hydrocarbon radical having from 1 to about 10 carbon atoms and $R_2$ is a hydrocarbon radical having 1 to about 10 carbon atoms.

4. The method of claims 2 wherein the reaction of step (a) is accomplished at a temperature within the range from about 10° C. to about 200° C.

5. The method of claim 3 wherein the reaction of step (a) is accomplished at a temperature within the range from about 25° C. to about 150° C.

6. The method of claim 1 wherein steps (b) and (c) are, in effect, accomplished simultaneously by reacting said alkali metal salt with an excess of acid in step (b) at a temperature within the range from about 40° C. to about 200° C.

7. The method of claim 6 wherein said acid is sulfuric acid.

8. The method of claim 1 wherein said elastomer is a copolymer of at least one diolefin having 4 to 12 carbon atoms and at least one alkenyl-substituted aromatic hydrocarbon compounds.

9. The method of claim 8 wherein said copolymer is a block copolymer.

10. The method of claim 9 where in said block copolymer comprises a single alkenyl-substituted aromatic hydrocarbon block and a single diolefin block.

11. The method of claim 10 wherein said active group comprising an alkali metal is attached to said diolefin block.

12. The method of claim 11 wherein said alkali metal is lithium.

* * * * *